United States Patent Office 3,639,412
Patented Feb. 1, 1972

3,639,412
CERTAIN N-SUBSTITUTED BIS-ARALKYL DERIVATIVES OF THIOISONICOTINAMIDE
Manfred Schorr, Frankfurt am Main, Germany, Hubert Mieth, Vienna, Austria, and Wolfgang Raether, Dreieichenhain, Germany, assignors to Farbwerke Hoechst Aktiengesellschaft vormals Meister Lucius & Bruning, Frankfurt am Main, Germany
No Drawing. Filed May 26, 1969, Ser. No. 827,961
Claims priority, application Germany, May 28, 1968,
P 17 70 513.4
Int. Cl. C07d 31/50
U.S. Cl. 260—294.8 E    3 Claims

ABSTRACT OF THE DISCLOSURE

Thioisonicotinic acid amides of the formula:

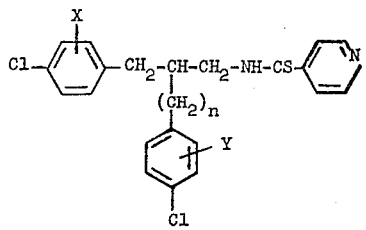

in which X and Y are hydrogen or chlorine and $n$ stands for zero or one, have been found to have chemotherapeutic activity against infections caused by protozoa.

---

The present invention provides thioisonicotinic acid amides of the general formula

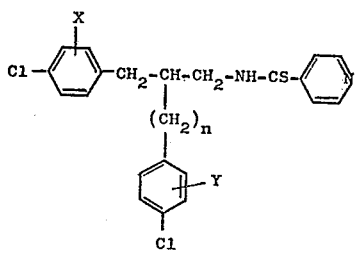

in which X and Y are the same or different and represent hydrogen or chlorine and $n$ stands for 0 or 1. The specified substances have a chemotherapeutic activity against infections caused by protozoa.

This invention, furthermore, relates to a process for the manufacture of said substances which comprises:

(a) Reacting isonicotinic acid amides of the general formula

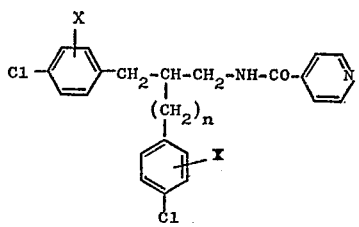

in which X, Y and $n$ have the meaning given above, with agent yielding sulfur, or (b) Reacting amines of the general formula

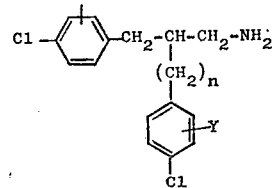

in which X, Y and $n$ have the meaning given above, with thiono-isonicotinic acid esters of the general formula

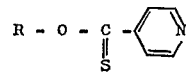

in which R is lower alkyl.

The isonicotinic acid amides used as starting materials according to method (a) may be obtained, for example, according to German Pat. No. 1,223,388. They can be converted into the corresponding thioamides by reacting them with agents yielding sulfur, for example phosporus pentasulfide or aluminum sulfide. For practical purposes the reaction components are mixed and the mixture is heated, preferably at 140 to 200° C. Theoretically, 0.2 mol of phosphorus pentasulfide is required for the conversion of one mol of amide into the thioamide. To achieve a quantitative reaction of the amide and thus a high yield, it is, however, advantageous to use a higher amount of phosphorus pentasulfide. A mixture of a molar ratio of 1:1 to 1:2 of amide to phosphorus pentasulfide has proved especially suitable. The reaction is generally complete after half an hour to 4 hours. To isolate the thioamide the cold melt is treated with water, dilute alkaline or alkali metal carbonate solutions. It is advantageous to heat the reaction mixture slightly in order to accelerate the decomposition of excess sulfide. The thioamide remains undissolved and is finally suction-filtered. It may be purified by recrystallization from a suitable solvent, mostly from a lower aliphatic alcohol.

The isonicotinic acid amides can also be reacted with phosphorus pentasulfide in the presence of solvents or diluents. Preferred solvents or diluents are, for example, aromatic hydrocarbons such as benzene, xylene or Tetraline, or ethers such as tetrahydrofurane or dioxane. Especially suitable is pyridine. Generally, the reaction is carried out by heating the reaction mixture up to the boiling point of the solvent and maintaining it at this temperaure for half an hour to five hours. The product obtained is worked up as indicated, if desired with prior separating the solvent used by distillation in vacuo.

It is advantageous to react the isonicotinic acid amides with aluminum sulfide in a melt of a salt containing crystal water. Especially suitable is, for example, crystallized sodium sulfate containing 6 molecules of crystal water. After the mixture has been maintained in the molten state for 1 to 2 hours, water is added and the product obtained is worked up as indicated above.

According to method (b), thioisonicotinic acid amides are obtained by reacting corresponding amines with thionoisonicotinic acid esters. The amines may be prepared according to German Pat. No. 1,103,936 or No. 1,110,171; the thiono-isonicotinic acid esters may be prepared by reacting corresponding imino-ethers with hydrogen sulfide. The reaction according to (b) already proceeds under mild conditions, for example on dissolving the reaction components in inert solvents such as diethyl ether, dibutyl ether, tetrahydrofurane or dioxane, and heating the solution to slightly elevated temperatures, preferably to the boiling point of the solvent. The thioamides precipitate during the process or are obtained in usual manner after separation of the solvent by distillation.

The novel thioisonicotinic acid amides are valuable medicaments, in as much as they exhibit a chemotherapeutic activity against protozoa. They are especially interesting since they are excellently tolerated and are capable of curing infections caused by Trypanosoma cruzi. A specific therapeutic substance active against this germ which causes the dreaded Chagas-disease is hitherto unknown. The novel thioisonicotinic acid amides show a good action on mice infected with Trypanosoma cruzi after parenteral administration on the fifth, seventh and ninth day post infectionem at a dosage of 1,250 mg./kg. of body weight. The results of such experiments carried out, for example with thioisonicotinic acid-N-[2,3-bis-(3,4-dichlorophenyl)-propyl]-amide and thioisonicotinic acid-N-[2-(4-chlorobenzyl) - 3-(3,4-dichlorophenyl)-propyl]-amide are compiled in Table 1.

The values shown were obtained by the following experimental method: The blood of mice containing Trypanosoma cruzi was suspended in a physiological solution of common salt and the suspension was standardized at 100,000 Trypanosoma per milliliter of diluted solution. In all curing tests, the infectivity dose per mouse was 0.5 ml. of the cited Trypanosoma-suspension; the animals were infected by subcutaneous injection. After four or, at the latest, five days, a parasitaemia with Trypanosoma cruzi could be established in all mice, whereupon the treatment was carried out in the above-disclosed manner.

The mice were then controlled over a period of 80 days beginning with the last treatment and then the experiment was interrupted. During this period, the blood of the infected and treated mice as well as that of the infected control animals was examined three times a week. The controls animals generally died of the infection between the ninth and twelfth day after infection, whereas the great majority of the infected and treated mice survived.

The dosis tolerata maxima (d.t.m.) was termed each on ten mice after a single administration of the two preparations. The results are compiled in Table 2.

able dosage unit contains from 0.5 to 5 g.; in special cases, however, higher or lower dosage units may be used.

The following examples serve to illustrate the invention, but they are not intended to limit it thereto.

EXAMPLE 1

Thioisonicotinic acid-N-[2,3-bis-(3,4-dichlorophenyl)-propyl]-amide

In a mortar 45.5 g. of isonicotinic acid-N-[2,3-bis-(3,4-dichlorophenyl)-propyl]-amide and 44.4 g. of phosphorus pentasulfide were carefully mixed and the mixture was then heated for 3 hours at 175° C. (oil bath temperature) in an open flask. After cooling a solution of 400 g. of sodium carbonate in 1 l. of water was added and the whole was heated for another 3 hours on the steam bath. After this time the whole reaction mixture had decomposed to form crystals which were suction-filtered. The crystals were purified by recrystallization from ethanol with addition of charcoal and 22.4 g. of thioisonicotinic acid-N-[2,3 - bis-(3,4-dichlorophenyl)-propyl]-amide, M.P. 142–144° C. were obtained.

EXAMPLE 2

Thioisonicotinic acid-N-[2,3-bis-(4-chlorophenyl)-propyl]-amide 38.5 g. of isonicotinic acid-N-[2,3-bis-(4-chlorophenyl)-propyl]-amide and 44.4 g. of phosphorus pentasulfide were carefully mixed and the mixture was heated at 150–160° C. in an open flask for 1 hour. The excess of phosphorus pentasulfide was then decomposed by adding a solution of 400 g. of sodium carbonate in 1 l. of water and heating for 3 hours on a steam bath. After cooling the product obtained was suction-filtered and carefully washed with water. 44 g. of thioisonicotinic acid-N-[2,3-bis-(4-chlorophenyl)-propyl]-amide were obtained which were purified by recrystallization from 350 cc. of ethanol. The pure product formed bright yellow crystals melting at 171–173° C.

TABLE 1

Treatment of mice infected with *Trypanosoma cruzi* administering the preparation I or II on the 5th, 7th and 9th day post infectionem

| Preparation | Dosage, mg./kg. subcutaneous | Total number of animals | Number of surviving animals after (days)— | | | | |
|---|---|---|---|---|---|---|---|
| | | | 10 | 20 | 40 | 60 | 80 |
| I | 3×1,250 | 60 | 58 | 55 | 52 | 51 | 51 |
| II | 3×1,250 | 30 | 29 | 27 | 26 | 26 | 26 |
| Untreated control animals | | 40 | 29 | 0 | 0 | 0 | 0 |

NOTE:
+=Experiment discontinued
I=Thioisonicotinic acid-N-[2,3-bis-(3,4-dichlorophenyl) propyl]-amide in Tylose
II=Thioisonicotinic acid-N-[2-(4-chlorobenzyl)-3-(3,4-dichlorophenyl) propyl]-amide in Tylose.

TABLE 2

Dosis tolerata maxima

| Preparation | Mode of administration | D.t.m. (mg./kg.) |
|---|---|---|
| Thioisonicotinic acid-N-[2,3-bis-(3,4-dichlorophenyl)-propyl]-amide. | Subcutaneous | 5,000 |
| | Oral | 5,000 |
| Thioisonicotinic acid-N-[2-(4-chlorobenzyl)-3-(3,4-dichlorophenyl)-propyl]-amide. | Subcutaneous | 2,500 |
| | Oral | 5,000 |

The substances of the invention are useful for the manufacture of pharmaceutical preparations active against infections caused by protozoa, especially against Chagasdisease. The preparations are preferably administered parenterally, preferably intramuscularly. The carriers and adjuvants used for the corresponding preparations are mucilagineous substances, for examples Tylose, dissolving mediators or emulsifiers, for example polyethylene glycol sorbitanoleate (Tween 80®), or solvents such as dimethylsulfoxide. The dosage chosen corresponds to the activity of the thioisonicotinic acid amides used. A suit-

EXAMPLE 3

Thioisonicotinic acid-N-[2,3-bis-(3,4-dichlorophenyl)-propyl]-amide

A mixture of 22.7 g. of isonicotinic acid-N-[2,3-bis-(3,4-dichlorophenyl)-propyl]-amide, 13.3 g. of phosphorus pentasulfide and 200 cc. of pyridine was refluxed for 3 hours. After cooling the melt was poured into 1 l. of ice water and rendered alkaline by adding 2 N-sodium hydroxide solution. After stirring for a short time the thioisonicotinic acid - N - [2,3 - bis - (3,4-dichlorophenyl)-propyl]-amide crystals were suction-filtered. The yield was 23 grams. The crystals were purified by recrystallizing them from ethanol. Melting point 143–144° C.

EXAMPLE 4

Thioisonicotinic acid-N-[2-(4-chlorobenzyl)-3-(4-chlorophenyl)-propyl]-amide 39.9 g. of isonicotinic acid-N-[2-(4-chlorobenzyl)-3-(4-chlorophenyl)-propyl]-amide, 22.2 g. of phosphorus pentasulfide and 120 cc. of pyridine were refluxed for 5 hours. The reaction mixture was then poured into 400 cc. of ice water and rendered alkaline by means of sodium hydroxide solution. The thioisonicotinic acid-N-[2-(4-chlorobenzyl)-3-(4-chlorophenyl)-propyl]-amide was first obtained as an oil which crystallized upon stirring. The crystals were suction-filtered, washed with water and recrystallized from ethanol. 26 g. of crystals having an intense yellow color and a melting point of 129–131° C. were obtained.

EXAMPLE 5

Thioisonicotinic acid-N-[2-(3,4-dichlorobenzyl)-3-(3,4-dichlorophenyl)-propyl]amide A mixture of 46.8 g. of isonicotinic acid-N-[2-(3,4-dichlorobenzyl) - 3 - (3,4 - dichlorophenyl)-propyl]-amide, 24.4 g. of phosphorus pentasulfide and 350 cc. of pyridine were refluxed while stirring for 3 hours. After cooling the mixture was poured into 2 l. of water and rendered alkaline by means of 2 N-sodium hydroxide solution. The thioisonicotinic acid - N-[2-(3,4-dichlorobenzyl)-3-(3,4-dichlorophenyl)-propyl]-amide first precipitated as an oil which crystallized after a short time. The crystals were suction-filtered, washed with water and recrystallized from ethanol. 35 g. of yellow crystals were obtained having a melting point of 158–160° C.

EXAMPLE 6

Thioisonicotinic acid-N-[2-(4-chlorobenzyl)-3-(3,4-dichlorophenyl)-propyl]-amide 43.3 g. of isonicotinic acid-N-[2-(4-chlorobenzyl)-3-(3,4-dichlorophenyl)-propyl]-amide, 24.4 g. of phosphorus pentasulfide and 350 cc. of pyridine were refluxed while stirring for 3 hours. The reaction mixture was then poured into 2 l. of water and rendered alkaline by means of a 2 N-sodium hydroxide solution. After having crystallized the precipitate was suction-filtered, washed with water and recrystallized from ethanol. 32.8 g. of thioisonicotinic acid - N - [2 - (4-chlorobenzyl)-3-(3,4-dichlorophenyl)-propyl]-amide having a melting point of 133–135° C. were isolated.

EXAMPLE 7

Thioisonicotinic acid-N-[2-(2,4-dichlorobenzyl)-3-(2,4-dichlorophenyl)-propyl]-amide A mixture of 46.8 g. of isonicotinic acid-N-[2-(2,4-dichlorobenzyl) - 3 - (2,4 - dichlorophenyl)-propyl]-amide, 24.4 g. of phosphorus pentasulfide and 350 cc. of pyridine were refluxed while stirring for 4 hours. The mixture was then poured into 1 l. of water and rendered alkaline by means of a 2 N-sodium hydroxide solution; the precipitate was suction-filtered after it had decomposed to form crystals. 53.5 g. of thioisonicotinic acid-N-[2-(2,4-dichlorobenzyl)-3-(2,4-dichlorophenyl)-propyl]-amide were obtained which could be recrystallized from n-butanol for purification. The yellow crystals melted at 201–202° C.

EXAMPLE 8

Thioisonicotinic acid-N-[2,3-bis-(3,4-dichlorophenyl)-propyl]-amide 17.5 g. of 2,3-bis-(3,4-dichlorophenyl)-propylamine and 8.4 g. of thiono-isonicotinic acid ethyl ester (prepared according to Japanese Pat. No. 7,482) were dissolved in 50 cc. of dioxane and the solution was heated at a bath temperature of 100° C. for 2 hours. After cooling 100 cc. of petrol ether were added thereto, whereupon a yellow oil precipitated which crystallized slowly. The crystals were suction-filtered, washed with petrol ether and the moist product was recrystallized from 16 cc. of ethanol. 3.2 g. of thioisonicotinic acid-N-[2,3-bis-(3,4-dichlorophenyl)-propyl]-amide having a melting point of 144–145° C. were obtained.

We claim:

1. A thioisonicotinic acid amide of the general formula

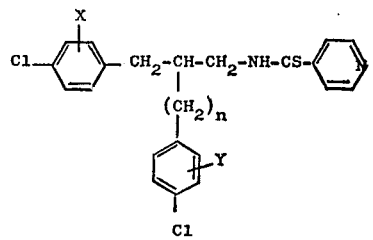

in which X and Y are identical or different and represent hydrogen or chlorine and $n$ stands for 0 to 1.

2. Thioisonicotinic acid - N-[2,3-bis-(3,4-dichlorophenyl)-propyl]-amide.

3. Thioisonicotinic acid - N - [2-(3,4-dichlorobenzyl)-3-(3,4-dichlorophenyl)-propyl]-amide.

References Cited

UNITED STATES PATENTS

| 2,843,594 | 7/1958 | Leditschke et al. | 260—295 |
| 3,290,318 | 12/1966 | Sause | 260—294.8 |

FOREIGN PATENTS

| 899,556 | 6/1962 | Great Britain | 260—295 |

ALAN L. ROTMAN, Primary Examiner

U.S. Cl. X.R.

424—266